April 9, 1963 — I. A. TOCHNER ET AL — 3,084,387
MOLDING APPARATUS
Filed Nov. 16, 1959 — 4 Sheets-Sheet 1

PARTS UNTHREADED FROM FORCES

PARTS EJECTED

FEED TRAY FORWARD

INVENTORS
IRVING A. TOCHNER
LOUIS A. ZELENKO
ERNST HAMMERMÜLLER
By Bulwinder Mattingly & Huntley
Attorneys

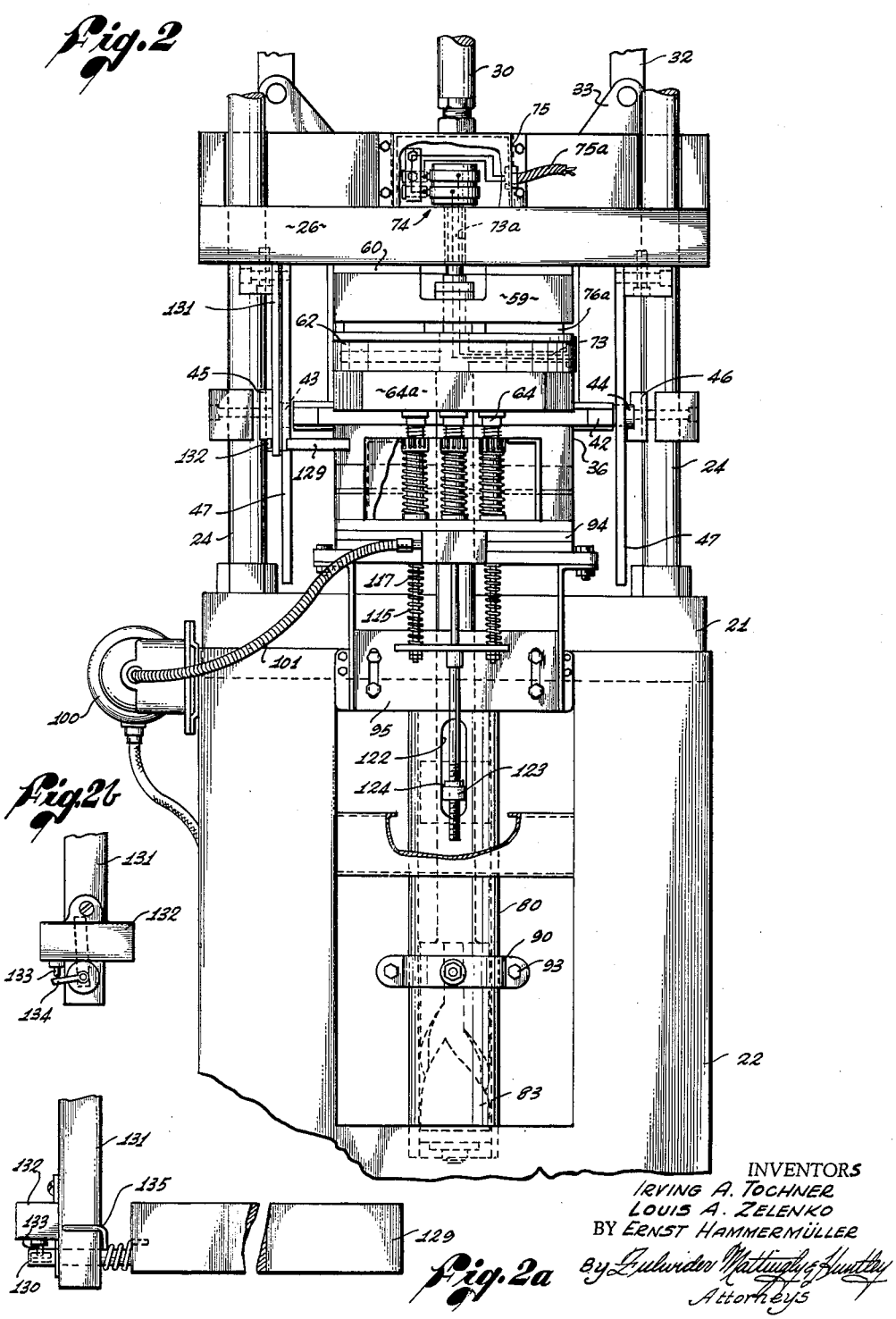

April 9, 1963     I. A. TOCHNER ET AL     3,084,387
MOLDING APPARATUS
Filed Nov. 16, 1959     4 Sheets-Sheet 3
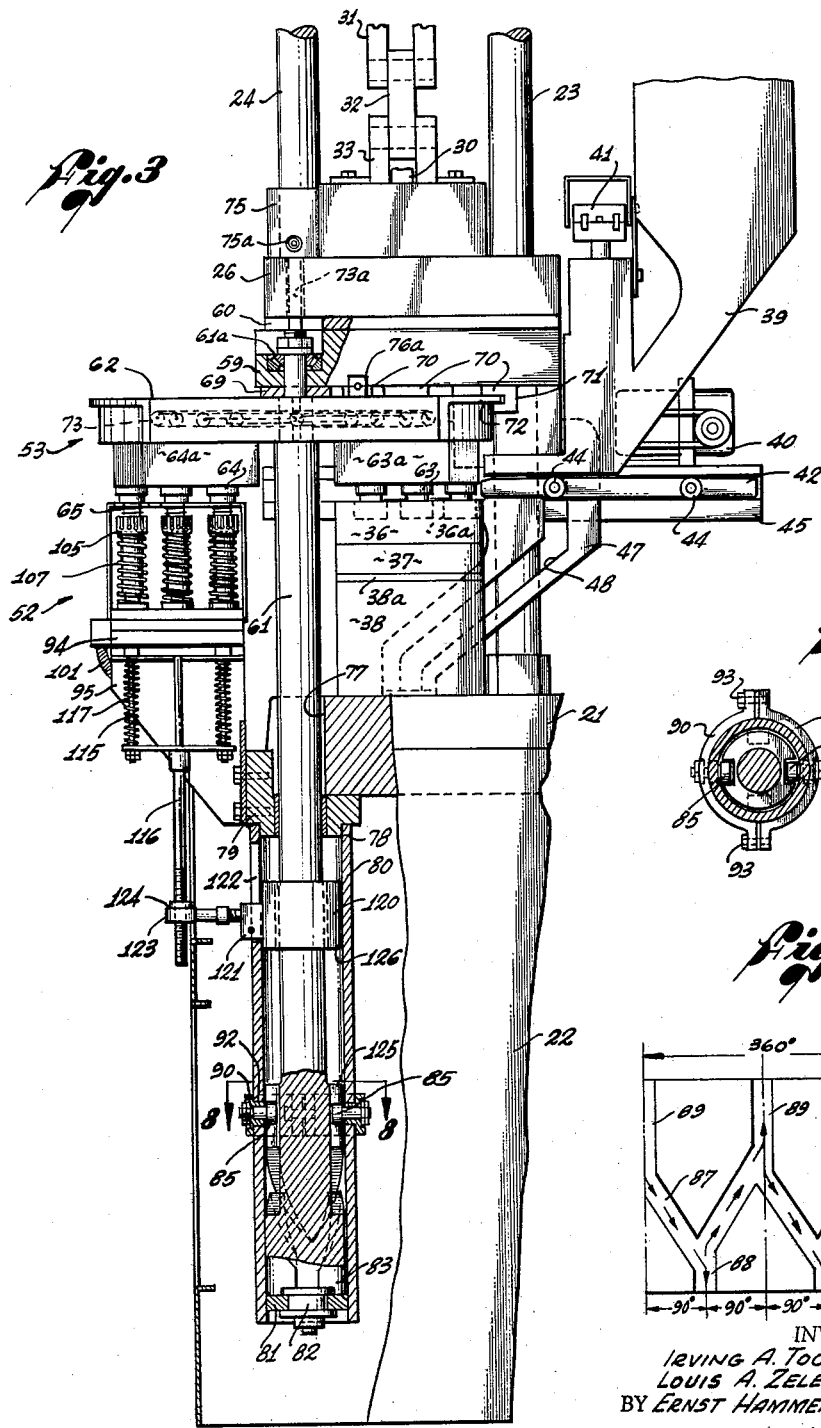
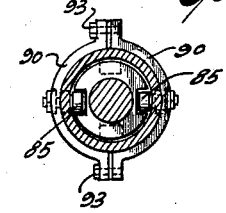
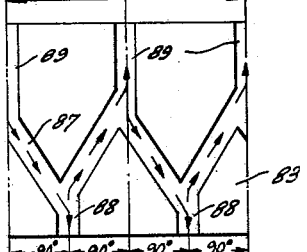
INVENTORS
IRVING A. TOCHNER
LOUIS A. ZELENKO
BY ERNST HAMMERMÜLLER
Attorneys

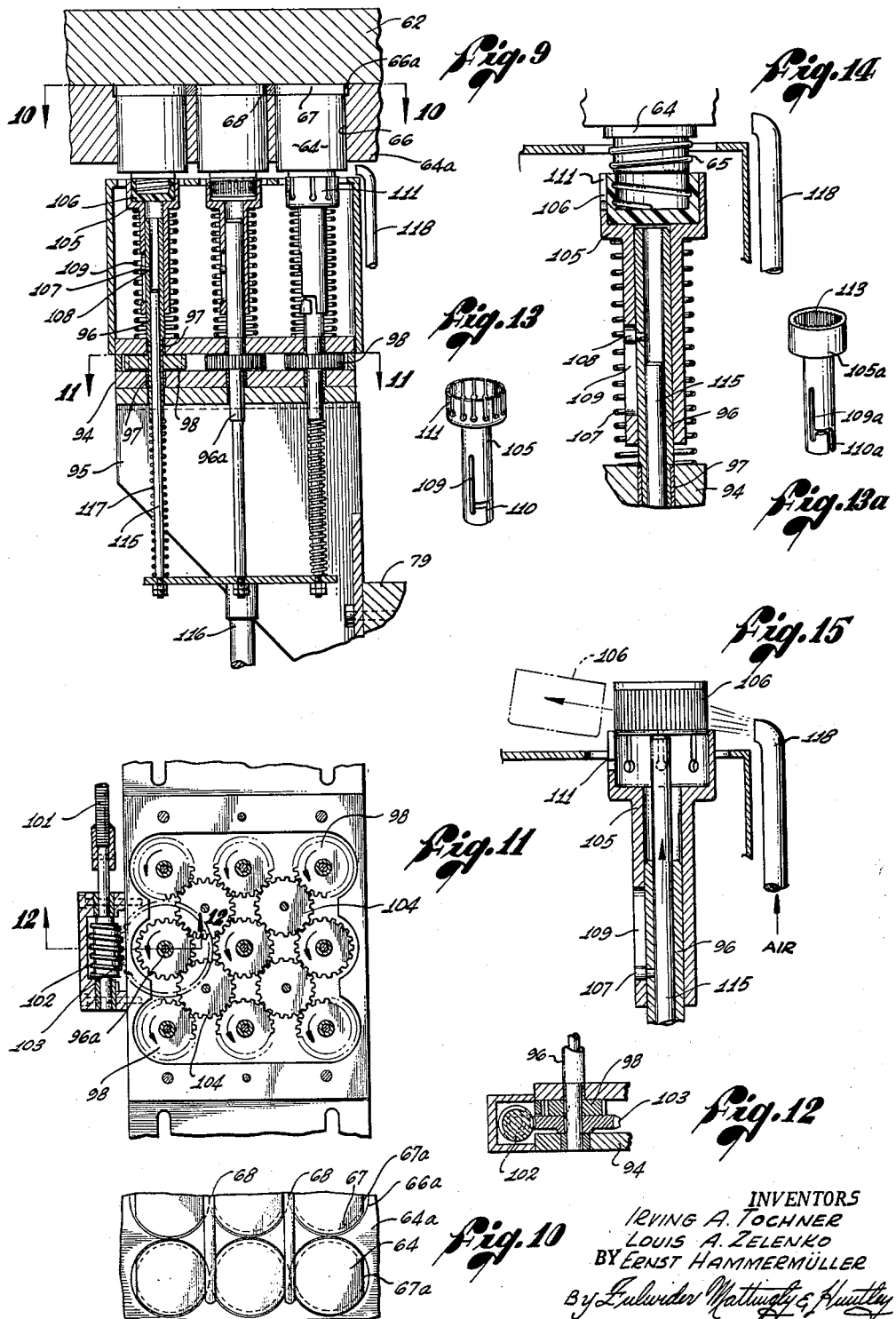

United States Patent Office 3,084,387
Patented Apr. 9, 1963

3,084,387
MOLDING APPARATUS
Irving A. Tochner, Los Angeles, Louis A. Zelenko, Redondo Beach, and Ernst Hammermueller, Glendale, Calif., assignors, by mesne assignments, to Dake Corporation, Grand Haven, Mich., a corporation of Michigan
Filed Nov. 16, 1959, Ser. No. 853,403
7 Claims. (Cl. 18—16)

This invention relates to molding apparatus and more particularly to apparatus for molding parts having re-entrant surfaces thereon, such as formed by threads.

A major problem area in the plastic molding industry is that of molding parts which have re-entrant surfaces thereon. Such re-entrant surfaces are often provided in order to form shoulders to engage some other part. Common examples of such re-entrant surfaces are helical threads, male or female, formed on an element, such as screwcaps.

Most plastic parts are normally molded in two part dies which may be closed together and cooperate to form a cavity to shape the part. Usually, one die is immovably secured to the base of a mold machine and the other die is mounted on a moving platen which moves it in a straight line to close against the stationary die and away from that die to open the cavity. Commonly, the dies are designed so that as they are moved apart, the molded element will remain with one die and thereby be pulled out of the other die. In order to eject the part from the die with which it remains, means such as an ejection pin extending through that die is used to push the part in the direction of separation of the two dies to disengage and remove the molded element.

A low cost production machine of the above type cannot be used to form re-entrant surfaces (and the resulting shoulders) on parts efficiently, because the finished part cannot be pushed out of the die which forms the re-entrant surfaces. Because threaded parts are commonly needed in commerce, special machines have been designed for molding such elements. However, most of these machines are complicated and, therefore, expensive to purchase and maintain. Further, such machines are normally only useful for making threaded parts.

One expedient employed in the past in the construction of dies for threaded and undercut parts is to construct the dies with movable segments or pieces which can be operated after the dies are separated to release the part. For example, some such dies have rotatable cores which form the threads on the molded element which cores may be rotated with respect to the remainder of the die to release the molded part, as the dies are separated. However, such dies have the disadvantage that molding material tends to clog the rotating mechanism of such a core. Further, it is hard to make such dies operate correctly at the high temperatures which are necessary to mold plastic.

There is a need for apparatus or an accessory which will adapt common compression or injection molding machines to efficiently produce parts having re-entrant surfaces thereon (such as threaded parts) without major modifications to the basic machine. With such structure, the machine becomes universal and can be used efficiently to mold parts which have no threads thereon as well as elements having re-entrant surfaces such as threaded parts.

Bearing in mind the above mentioned problems and needs of the plastic molding industry, a major object of this invention is to provide new versatile molding apparatus which is particularly useful for forming on parts molded thereby re-entrant surfaces which are engaged in such relation by at least one of the mold dies, that the part must be moved in a direction other than the direction of separation of the mold dies to remove it from the die so engaged.

It is another object of the present invention to provide thread molding apparatus which does not require any movable parts in the dies themselves.

It is still another object of this invention to provide an accesory which may be mounted on a standard molding machine to enable such machine to rapidly mold parts having threads thereon.

An important object of this invention is to provide apparatus for molding threaded parts which will automatically unthread and eject the parts after they have been molded.

This invention has the further object of providing apparatus for molding threaded parts which is less expensive to construct and maintain than previous machines for this purpose.

It is a still further object of this invention to provide apparatus for molding threaded parts which may be easily and inexpensively adapted to handle a wide variety of different sized parts.

Other and further objects of this invention will become apparent in the detailed discussion below in conjunction with the attached drawings, wherein:

FIGURE 2 is a front elevation of the apparatus shown in FIGURE 1;

FIGURE 2a is a front view of a safety device used with the present invention;

FIGURE 2b is a side view of the safety device shown in FIGURE 2a;

FIGURE 3 is a partailly cut away side view of the apparatus illustrated in FIG. 1;

FIGURE 7 is a developmental view of a cylindrical tracking cam used with the presently preferred embodiment of the invention;

FIGURE 8 is a cross section view taken along line 8—8 in FIGURE 3;

FIGURE 9 is a side cross section view of a part of the above apparatus showing mechanism for unthreading the molded parts;

FIGURE 10 is a fragmentary plan view of the forces (male die members )taken along line 10—10 in FIGURE 9;

FIGURE 11 is a sectional view, as seen along line 11—11 in FIGURE 9, showing a gearbox used in unthreading the molded parts;

FIGURE 12 is a partially sectioned view taken along line 12—12 in FIGURE 11;

FIGURE 13 is a pictorial view of a first presently preferred form of a collet which is used to unthread the molded parts;

FIGURE 13a is a pictorial view of a second presently preferred form of a collet which is used to unthread the molded parts;

FIGURE 14 is an enlarged side view of one of the collets after it has unthreaded a molded part; and FIGURE 15 is an enlarged side view illustrating how each molded part is ejected from the unthreading collet and blown away by a blast of compressed air.

The Preferred Embodiment in General

The invention may be employed in various types of molding apparatus. The embodiment shown is a multiple cavity mold for internally threaded caps, such as used on tooth paste tubes. Instead of the usual single set of upper die cavities or cores, the present machine has two sets of thread forming die cores which are carried on a turret mounted to move up and down with the moving platen of a molding machine, the turret being also rotated by such up and down motion. Located on the molding machine is the usual set of stationary die cavities with which the sets of thread forming cores alternately cooperate to form molded parts. Adjacent the fixed cavities, means are provided for unthreading molded elements from the turret carried cores.

With the arrangement outlined above, at each cycle of operation one set of thread forming cores cooperates with the fixed die cavities to mold parts while the unthreading means removes previously molded elements from the other set of turret carried cores. Each time the platen is moved up and down, the turret is rotated to bring a set of thread forming cores with molded parts thereon into cooperating relation with the unthreading means which removes the molded elements from the cores.

Description of Molding Machine

Figure 1:
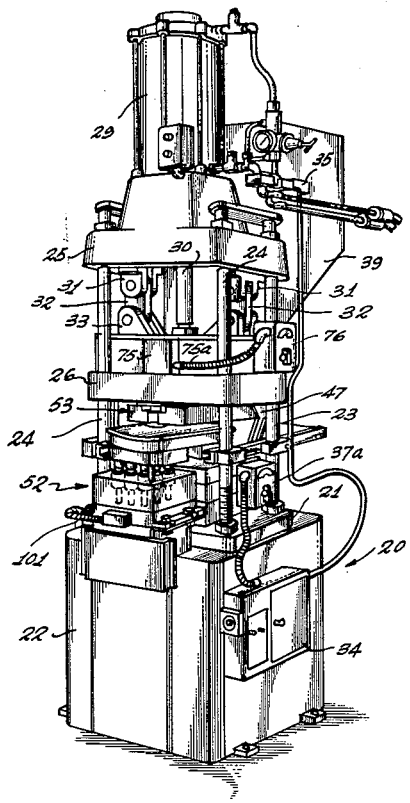
FIGURE 1 is a pictorial view of a compression molding apparatus with an attachment embodying the present invention.
Figure 4:
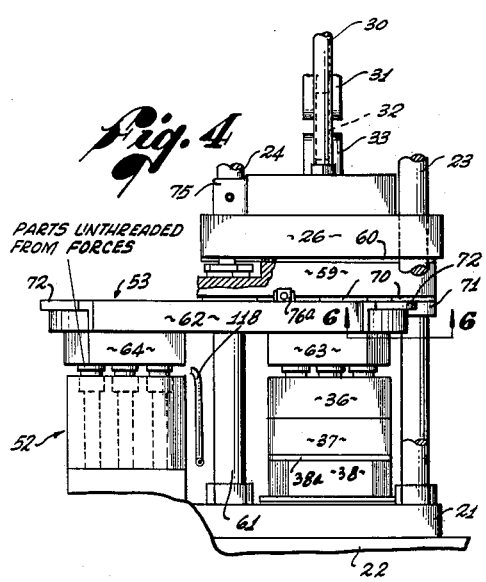
FIGURE 4 is a partial side view of the presently preferred form of apparatus embodying the invention.
Figure 6:
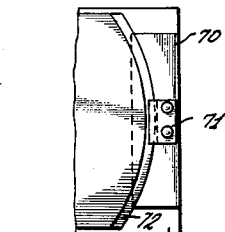
FIGURE 6 is a fragmentary view along line 6—6 in FIGURE 4.

Referring now to FIGURE 1, the presently preferred embodiment of the invention will be described in more detail. In this figure is shown a compression molding machine having a base assembly 20 formed of a base 21 supported by a skirt 22. Extending upwardly from the base 21 are two rear posts 23 and two front posts 24 secured together at their upper ends by a cross head 25 and thus held in parallel relation to guide a moving platen 26 toward and away from the base 21.

Figure 5:
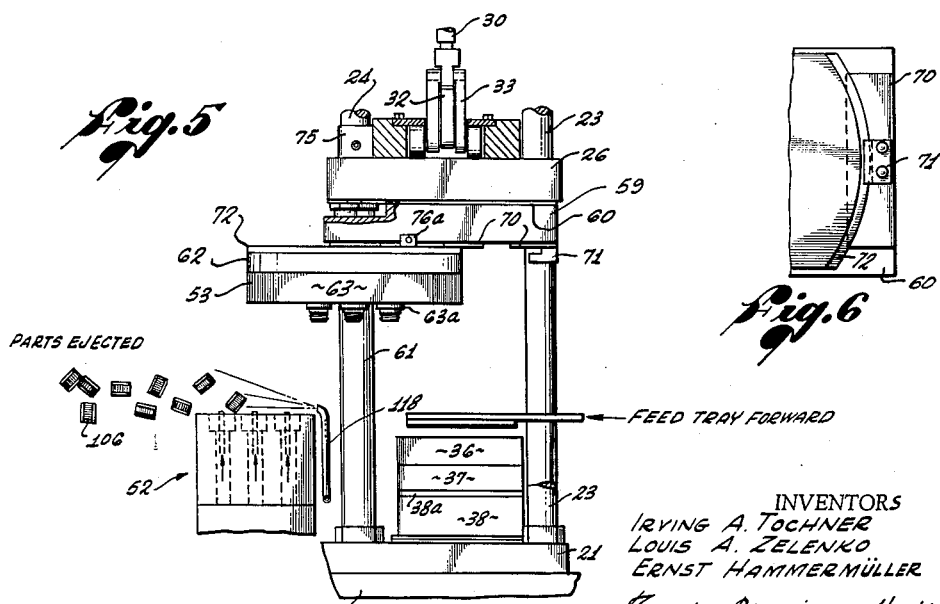
FIGURE 5 is a partial side view of the apparatus in FIGURE 1, illustrating the operation thereof.

Any conventional means may be used to move the platen 26 up and down on the posts 23 and 24, but for purposes of illustration herein, a prime mover disclosed in Patent No. 2,839,786 is shown in the present drawings. The prime mover includes a pneumatic actuating cylinder 29 having a piston therein which drives a ram 30 up or down, as described. In order to multiply the force exerted on the ram 30, a toggle linkage is used. The toggle linkage includes a pair of clevises 31 having a pair of connecting links 32 to which a pair of levers 33 are mounted. The inward end of each of the levers 33 is attached to the lower end of the ram 30 and have rollers at intermediate portions thereon which ride in horizontal tracks on the moving platen 26. (In FIGURE 5, the rollers of the left side lever 33 may be seen.) With the above described arrangement, the platen 26 may be moved upwardly and downwardly by moving the ram 30 upwardly and downwardly.

The operation of the machine is to be carried out automatically, for which purpose conventional controls are provided within an electrical control box 34 attached to the right side of the skirt 22. Located in the box 34 is a timer which sends proper electrical signals to an electrically actuated four-way pneumatic valve 35 which supplies and vents pressure above and below the piston in the actuating cylinder 29 to move the ram 30 up and down. The valve 35 and the associated air conduits are conventional, and therefore, further description is not felt to be necessary.

Referring now to FIGURES 2 and 3, a stationary die or female mold cavity assembly is located on the base 21 between the posts 23 and 24. This assembly comprises a mold cavity block 36 which has a plurality of female mold cavities 36a in its upper side. Secured to the underside of the block 36 is a heater 37 controlled by a thermostat 37a affixed to the right side of the assembly (FIGURE 1). A spacer 38, attached to the base 21 and insulated from the heater 37 by insulation 38a, is affixed to the underside of the heater 37 to position the block 36 an appropriate distance above the base 21.

Powdered plastic molding material is supplied to the mold cavities 36a each time the platen 26 is moved upwardly, by means similar to the supply means illustrated in the above mentioned Patent No. 2,839,786. It is desired that the present molding machine be able to opate over a long period of time without constant attention and, therefore, a relatively large supply hopper 39 is attached to the rear of the molding machine to hold the powdered plastic molding material. Located within the hopper 39 at the bottom thereof is a series of mixing blades (not shown). These blades are turned by a mixer motor 40 in order that heat from an infrared lamp 41 may preheat the powdered material uniformly just prior to the time it is supplied to the mold cavities 36a.

In order to meter the supply of material delivered from the hopper 39 to the mold cavities 36a, the feed tray 42 is located adjacent the open bottom of the hopper 39 and is mounted for horizontal movement on rollers 43 and 44, respectively, running on left and right horizontal tracks 45 and 46, respectively. To move the tray 42 forward as the platen 26 is moved upwardly, left and right cam plates 47 having cam slots 48 therein are secured to the platen 26. As can be seen in the drawings, the front rollers 43 and 44 ride in the cam slots 48 as well as the tracks 45. Therefore, as indicated schematically in FIGURE 5, due to the shape of the slots, the tray 42 is moved to the forward position when the platen 26 is moved to its upward position. At that position, the tray 42 discharges the powder into the cavities 36a.

The molding operations having been described, we now turn our attention to the presently preferred form of the invention which adapts the molding machine to produce parts having threads thereon. The accessory which embodies the invention includes two main portions, to wit, removal or unthreading means 52 which has an ejecting means and transfer means 53 for moving the molded parts from the position in which they are removed from the die cavities to the unthreading means.

Means for Transferring the Molded Parts to the Unthreading Means

The arrangement of the transfer means 53 may be best seen in FIGURES 2 and 3. Attached to the underside of the platen 26 is an adapter plate 59 and a sheet of heat resistant insulation material 60. A shaft 61 is rotatably mounted to the adapter plate 59 by means of a bearing 61a and carries a turret 62 affixed thereto for rotation with the shaft. The turret 62 has a generally oblong shape and carries a first set of thread forming die cores on one end and a second set of thread forming die cores on the other end. We refer to these die cores as "thread forming" because each has a portion which forms a female thread in the molded part. In the embodiment shown, the first set of such cores comprises a plurality of threaded male core members or forces 63 carried by a first core plate 63a which is attached to the turret 62 while the second set of similar forces 64 carried by the second core plate 64a is attached to the other end of the turret 62.

The manner in which the forces 63 and 64 are mounted in the core plates 63a and 64a is illustrated in FIGURES 9 and 10. Here it may be seen that the core plate 64a has a plurality of bores 66 each of which is counterbored at 66a adjacent the upper end. The forces 64 each have a flange 67 which is received in the counterbore 66a when the force is inserted into a bore 66 from above. In order to prevent the forces 64 from rotating, each flange 67 is cut away at 67a on the opposed sides forming "flats" which engage retaining keys 68 located in slots on the upper surface of the core plate 64a. With this arrangement, the forces 64 may be replaced by removing the core plate 64a from the turret 62 and pushing the forces upwardly out of the bores 66. Therefore, a wide variety of forces may be used without changing the basic structure of the apparatus.

With the apparatus in the position shown in FIGURE 3, it can be seen that the cavity plate 63a is pushed against the cavity block 36 by the downward force of the platen 26 acting through the adapter plate 59 and turret 62. This causes the individual forces 63 to enter the respective cavities in the block 36.

In order to revolve the turret 62 with a minimum of friction between it and the adapter plate 59, a brass bearing ring 69 and a series of transverse pressure blocks 70 are provided between these members as shown. It is also desirable that the forces 63 and 64 be properly aligned with the mold cavities, therefore, a guide block 71 having a recess receiving a lip 72 on the edge of the turret 62 is also attached to the adapter plate 59.

As seen in FIGURES 14 and 15, each of the forces 64 has a helical male thread 65 which projects horizontally into the molded part from the rest of the force 64 to form a helical female thread in the molded part. If a male thread is to be formed on the exterior of a molded part, each thread forming die part is shaped with a cavity having a female thread on the inner surface thereof which would project horizontally into the molded part from the rest of the die.

In either case, the thread is formed on the molded part, because the thread forming die has a re-entrant or undercut portion which projects from the rest of the die into the molded part transversely to the direction of separation of the movable and fixed dies. In either case, interengaged threads are formed on the molded part so that it cannot be disengaged from the die by merely moving the part toward the stationary die.

The forces 63 and 64, as well as the rest of the dies must be heated in order to mold the plastic. For this purpose, electric heating elements 73 are located within the rotating platen 62. Current is supplied to the elements 73 through two wires which extend with the shaft 61 upwardly through a bore 73a in the platen 26 to a pair of slip rings 74 (FIGURE 2) mounted to the platen 26 within a cover 75. Current is supplied to the slip rings 74, through a pair of wires in a conduit 75a leading from a control 76 attached to the platen 26 (FIGURE 1). In operation, the operator adjusts control 76 to the desired temperature at which the turret 62 is to be maintained, and a thermo-couple at 76a attached to the adapter plate 59 cooperates with the control 76 to maintain the desired temperature.

*The Means by Which the Turret Is Rotated*

Having described the details of the turret 62 and the associated structure, we would now turn to a description of the manner in which the turret 62 is caused to rotate in synchronism with the molding cycle. As can be seen best in FIGURE 3, the turret shaft 61 extends down through a relief slot 77 in the base 21 and is slidably journalled in sleeve bearing 78 carried in an adapter bracket 79 mounted on the front of base 21. Extending downwardly from the bracket 79 is a fixed cylinder 80 which slidably engages and guides a guide bushing 81 rotatably mounted on the bottom of the shaft 61 on a bearing 82.

Just above the bushing 81 is a cylindrical tracking cam 83 formed on the lower portion of the shaft 61. The cam 83 cooperates with a pair of cam follower rollers 85 which are mounted in the cylinder 80 and which engage the cam to rotate it and the shaft 61 180° each time it is moved up and down. The particular manner in which this is done can best be seen by referring to the developmental view of the cam in FIGURE 7. As shown, the cam has a series of helical grooves 87 which extend at generally a 45° angle to the axis of the shaft, as well as two lower dwells 88 and two upper dwells 89. Each of the dwells 88 and 89 is asymmetric to the juncture of the two helical grooves 87 which it adjoins. With this type of cam, the rollers 85 will pass through the grooves 87 and 88 and 89 in the direction of the arrows, as the shaft 61 is moved up and down.

The rollers 85 are subject to considerable wear and, therefore, it is desirable that they may be easily replaced. To this end, the rollers 85 are each rotatably mounted on a stub shaft 91 fixed in a semi-circular bracket 90. The rollers 85 when placed on the shaft 91 are positioned within the cylinder 80 by merely pushing the rollers 85 through diametrically opposed holes 92 in the wall of the cylinder and attaching the brackets together by means such as a pair of bolts 93.

In operation, the cam 83 causes the shaft 61 and therefore the turret 62, to revolve in the following manner as the platen 26 is moved up and down. With the platen 26 in the downward position, as shown in FIGURE 3, the upper dwells 89 are engaged by the rollers 85. Then, the platen 26 and hence the shaft 61 are moved upwardly, until the cam 83 has moved to a position where the helical grooves 87 of the cam 83 engage the rollers 85. At this time, the forces 63 are lifted clear of the mold cavities 36a and the forces 64 are clear of the unthreading means so that the turret 62 may now be rotated as the shaft 61 continues upwardly. The upward movement continues until the lower dwells 88 are engaged by the rollers 85. At this point, the turret 62 has been rotated 90° to the position shown in FIGURE 5.

Then, as the platen 26 moves the shaft 61 downwardly, the rollers 85 upon being engaged by the helical grooves 87, cause the shaft to rotate 90° more by the time that the upper dwells 89 reach the rollers 85. At this point, the rollers 85 cooperate with the dwells 89 and guide the forces 64 vertically downward into the mold cavities 36a. Simultaneously, the forces 63 with the molded parts thereon have been moved into cooperating relation with the unthreading means 52. Then, after the forces 64 have aided in molding new parts in the mold cavities 36a, the turret 62 is rotated another 180° by moving the platen 26 through another cycle to its upper position and then back down to its lower position, as the operation continues.

*The Unthreading Means*

We have described the manner in which the molding machine works and the manner in which powdered plastic molding material is supplied to the mold cavities, each time the dies are cycled by the automatic timer. Further, we have described the manner in which the turret 62 is revolved in order to mold parts first on the forces 63, then on the forces 64 and then on the forces 63 again, etc. We now turn our attention to the means for removing the molded parts from the forces 63 and 64. Since the forces 63 and 64 form an interengaged thread on the molded parts, we refer to the removal means as unthreading means in describing the presently preferred embodiment. As will be seen, the unthreading means 52 rotates the molded parts relative to the forces 63 and 64 to unthread the part. If some other type of re-entrant surfaces are formed on the molded part, the removal means may be designed to give the part such other type of motion as is required to disengage it.

In the illustrated embodiment, the unthreading means includes a gear box 94 which is mounted on the adapter bracket 79 by means of a support 95 and which carries a plurality of hollow rotatable shafts 96. (See FIGURES 9 to 15 in particular.) As illustrated best in FIGURE 9, each shaft 96 is reduced at its lower end 96a which extends through a pair of bearings 97 and has a driven gear 98 affixed thereto. Rotation of the shafts unthreads the molded parts as will be described. In order to rotate the shafts 96 at desired times, a motor 100 (shown attached to the left side of skirt 22 in FIGURE 2) is connected by means of a flexible drive shaft 101 to a worm 102 (FIGURES 11 and 12) to rotate a worm gear 103 affixed to the center one of the three front rotatable shafts 96a. The other shafts 96 are drivingly coupled to the center shaft 96a by idler gears 104 (FIG- URE 11) mounted on stub shafts in the gear box 94 and which intermesh with the various driven gears 98. With this arrangement, when the worm 102 rotates the center front shaft 96a, the driven gear 98 on that shaft causes all the other shafts 96 to rotate also.

Mounted to rotate with each shaft 96 is a collet 105 which has spring fingers 111 to grip a molded part of work piece 106 (a threaded cap in this case) carried on one of the forces 64. The platen 26 holds the forces 64 stationary during the unthreadening operation, and, therefore, each collet 105 is forced downwardly, as shown in FIGURE 14, as the collet 105 unthreads the part 106. For this reason, each of the collets 105 is mounted for a limited vertical motion relative to its respective shaft 96 and a spring 107, located around each collet, resiliently urges each collet upwardly against the molded part 106. Each shaft 96 is rotatively coupled to its respective collet 105 by a pin 108 in the side of the shaft 96 which rides in a vertical slot 109 through the side of the collet.

The collets 105 are designed to engage a particular size of molded part. Therefore, it is desirable that the collets 105 be removably mounted to the shafts 96 so that other collets may be substituted, to adapt the apparatus to handle different sizes and shapes of threaded molded parts. As shown in FIGURE 13, this is accomplished by providing an offset entrance slot 110 which communicates with the vertical slot 109. With this arrangement, the collet 105 may be mounted on the shaft by merely orienting the pin 108 with the entrance slot 110, pushing the collet downwardly, and then rotating it until the pin moves into the slot 109. As can be seen, the slot 109 extends a small distance below the entrance slot 110 to prevent the pin from accidentally moving back into the entrance slot 110 when the shaft 96 is rotated.

In FIGURE 13a, a modified form of collet 105a is shown which differs from the collet 105 in that instead of spring fingers 111, the collet head is internally splined at 113 to engage a knurled molded part.

*Means for Ejecting the Molded Parts From the Unthreading Means*

After the parts 106 have been unthreaded from the forces 64, they must be ejected from the collets 105. In the preferred embodiment, the ejecting means for each collet takes the form of an ejector pin 115, slidably located in the respective shaft 96. Attached to the lower end of the pins 115 is an actuating rod 116 by which the pins may be moved upwardly into the ejecting position against return springs 117 located around four of the pins, as shown. As illustrated in FIGURE 15, after the forces 64 have been lifted, the pins 115 are moved upwardly to eject the parts 106 from the collets 105 at which time they are blown into a receiving hopper (not shown) by a stream of compressed air from nozzles 118.

The manner in which the actuating rod 116 is operated to move the ejector pins 115 upwardly, is best shown in FIGURES 2 and 3. There, it may be seen that located within the cylinder 80 is a slidably mounted actuator sleeve 120 which has a boss 121 extending through a vertical slot 122 in the cylinder 80. Extending from the boss 121 is an eyebolt 123 which engages the under surface of an adjustable nut 124 on the lower threaded portion of the rod 116.

The forces 64 (or 63) are lifted clear of the unthreading means before the ejector pins 115 push the molded parts 106 out of the collets 105. Therefore, the sleeve 120 remains in the position shown, supported by the boss 121 resting in the lower end of the slot 122, until an upper shoulder 125 on the cam 83 engages the sleeve 120. At that time, continued upward movement of the cam 83 moves the sleeve 120 and, therefore, the pins 115 upwardly to eject the parts.

*Operation of the Unthreading and Ejecting Means*

The operation of the unthreading means and ejecting means will be discussed only in relation to the molded parts on the forces 64 because these means cooperate with the molded parts on the forces 63 in the same manner. As the platen 26 moves the forces 64 downwardly to the unthreading means, the molded parts 106 are received in the collets 105 and engaged by the spring fingers 111, as shown in FIGURE 9. Then, while the parts are being molded on the forces 63, the motor 100 is actuated, rotating the collets 105 and unthreading the parts 106 from the forces 64. Since during this time the forces 64 do not move upwardly, the spring 107 is compressed as the collet 105 is moved downwardly by the unthreading operation to the position shown in FIGURE 14. At this point, the motor 100 is stopped and the collets remain in the position shown in FIGURE 14 while the molding operation with the forces 63 continues.

As previously mentioned, the present machine will operate over a long period of time without attention. Therefore, it is desirable that some safety means be provided to automatically shut off the machine if for some reason a part 106 should fail to be unthreaded and removed from one of the forces 63 or 64. A means which is presently being used to accomplish this is shown in FIGURES 2, 2a, and 2b of the drawings. The presence of a part improperly remaining on one of the forces is detected by a horizontal sensor bar or trigger 129 located so that the forces move over it as they move from the unthreading to molding position. The trigger 129 is a flat plate and has an axle 130 adjacent its lower edge journalled in the lower end of a vertical rod 131 which is pendently attached to the platen 26 whereby the trigger 129 will move up and down with the platen 26 and the turret 62.

The trigger 129 is so located that in its unactuated position shown, its upper edge barely clears the lower ends of the forces 63 and 64, as the turret 62 is revolved. A micro switch 132 is secured to the lower end of the rod 131 with its actuating button 133 engaging an arm 134 which extends from the axle 130a. The micro switch 132 is electrically connected to the controls in control box 34 so that the machine will operate so long as the arm 134 engages and presses the button 133. A torsion spring 135 is provided, as shown, to yieldably hold the trigger 129 in the vertical position so that the arm 134 normally presses the switch button 133. With this arrangement, if any part 106 is not removed by the unthreading operation, it will project downwardly enough to trip the trigger 129 and open the switch 132 to stop the machine.

The embodiment shown is particularly adapted to mold threaded parts because such parts are the most common type of element having re-entrant surfaces. Further, in order that the description of the particular embodiments would be more easily understood, the apparatus was described mainly in terms of threaded parts. However, it will be apparent to those skilled in the art that such is by way of illustration only and that numerous changes and modifications may be made without departing from the spirit of the present invention. Therefore, it is our intention that this invention be limited only to the scope of the appended claims.

We claim:

1. Molding apparatus comprising: a frame; fixed die means on said frame; a first shaft operably associated with said frame for rotating an axial motion relative to said frame; a turret secured to said shaft; movable die means secured to said turret cooperable with said fixed die means for forming a thread on a work piece; a platen reciprocally mounted with respect to said frame and means to reciprocally move said platen; an adapter plate to which one end of said first shaft is rotatably mounted, said adapter plate being adapted to be mounted to said moving platen of a molding machine so that said shaft extends axially in the direction of motion of said platen; unthreading means mounted to said frame for unthreading a work piece from said movable die means, said unthreading means including a rotatable hollow second shaft and means to rotate said second shaft, engaging means comprising a collet mounted to and rotated by said second shaft for gripping and rotating a work piece on said movable die means; a spring resiliently urging said collet against a work piece carried by said movable die means; and ejecting means to eject a work piece from said engaging means, said ejecting means including a pin movably received through said second shaft, said pin being moved to eject a work piece from said engaging means when the first shaft is moved axially to carry the die means away from the unthreading means; and means cooperating with said frame and said first shaft for rotating said first shaft when the shaft is moved axially to move said die means between a position at which a work piece is molded by said die means and a position where said die means is moved into cooperating relation with said unthreading means.

2. A molding machine comprising: a frame carrying a stationary mold die; a first shaft mounted to said frame for rotating and axial motion; a turret affixed to said shaft; a moving die secured to said turret; said stationary die and moving die being spaced from the axis of rotation of said shaft the same distance; removal means including a hollow rotatable shaft spaced from the axis of rotation of said first shaft the same distance as said stationary die but in a different direction, means for rotating said hollow shaft, a collet movably mounted to said hollow shaft for limited axial movement, a spring around said hollow shaft resiliently urging said collet against a work piece carried by said moving die; ejecting means for ejecting removed work pieces away from the collet, said ejecting means including a pin slidably received within said hollow shaft and connected to an actuator sleeve slidably located on said first shaft, said first shaft having a projection which engages said sleeve after the shaft has moved axially carrying the moving die a substantial distance away from the removing means.

3. A molding machine comprising: a frame; a mold die carried by a base on said frame; removal means mounted to said frame; a first and a second moving die; a moving platen mounted to said frame for up and down motion; means mounting said moving dies on said platen for up and down movement therewith and for shifting movement relative thereto toward and away from said mold die and removal means, said moving dies being in cooperating relation with said mold die and removal means after the moving platen is moved down; and camming and alignment means responsive to said up and down motion to shift said platen and alternately rotationally align said first moving die with said mold die and said second moving die with said removal means and vice versa, said camming and alignment means including a generally cylindrical cam mounted to said platen to reciprocate therewith and a fixed follower mounted to said frame, said cam having a generally zig-zag shaped actuating groove extending around the surface of the cylinder, said cam having a series of vertical dwells adjoining said actuating groove at positions so that said follower will be in a different one of the dwells as said first and second moving dies are alternately moved into cooperating relation with said mold die and as said cylinder is reciprocated therewith and rotated by said camming means; and engaging means on said removal means to engage and move a work piece on said first and second moving dies relative thereto when each of said dies is in cooperating relation with the removal means.

4. In a molding machine having dies, unthreading means for unthreading a molded part from one of said dies which has means thereon to form a thread on the part, said unthreading means comprising: a shaft having a rotational engaging pin extending laterally outwardly therefrom, and said shaft being rotatably mounted to the frame of said machine; a collet mounted to said shaft, said collet having an extending slot receiving said pin whereby said collet will rotate with said shaft but may move axially a limited distance thereon, said collet having a plurality of gripping elements extending upwardly to grip a work piece carried by the thread forming die; a spring located and engaging said collet to resiliently urge it toward said thread forming die, said spring being the only restraining force against axial movement of said collet; rotational drive means operably engaged with said shaft, whereby said work piece having any of a variety of thread configurations can be readily placed into engagement with said gripping elements and rotatably and axially moved out of engagement with said forming die; and ejection pin means through said shaft and collet and movable with respect thereto to eject the unthreaded work piece from said collet.

5. Molding apparatus comprising: a frame; first die means on said frame; a shaft operably associated with said frame for rotational and axial motion relative to said frame; a turret secured to said shaft; second die means secured to said turret and cooperative with said first die means for forming a thread on a work piece; a platen reciprocally mounted with respect to said frame and means to reciprocally move said platen; said shaft being rotatably mounted to said moving platen so that said shaft extends axially in the direction of motion of said platen; unthreading means mounted to said frame for unthreading a work piece from said second die means; said unthreading means including engaging means comprising a rotatable collet for gripping and rotating a work piece on said second die means; a spring resiliently urging said collet against a work piece carried by said second die means; ejecting means to eject a work piece from said engaging means when said shaft is moved axially to carry the second die means away from the unthreading means; and means cooperating with said frame and shaft for rotating said shaft when the shaft is moved axially to move said second die means between a position at which a work piece is molded by said second die means in cooperation with said first die means, and a position where said second die means is moved into cooperating relation with said unthreading means.

6. Molding apparatus comprising: a press including a reciprocating head; an actuator shaft rotatably mounted to said head and adapted to reciprocate with said head; a stationary mold spaced from said shaft actuator in a first radial direction, and adapted to cooperate with die means to form an article; an article removal means spaced from said actuator shaft in a second radial direction; a turret mounted on said actuator shaft and adapted to reciprocate therewith; first and second die means on said turret positioned to correspond respectively and alternatively with said mold and said article removal means; each of said die means when cooperating with said mold enabling an article to be formed therebetween; camming means associated with said actuator shaft causing rotational movement of said actuator shaft and turret simultaneously with the reciprocating movement thereof; said camming means simultaneously rotationally aligning said first and second die means respectively with said mold and removal means, and vice versa; and said reciprocating actuator shaft and turret causing simultaneous cooperation between said first die and said mold and between said second die and said removal means and vice versa.

7. Molding apparatus comprising: a press including a reciprocating head; an actuator shaft mounted to and adapted to reciprocate with the head of said press; a stationary mold spaced from said actuator shaft in a radial direction, an article removal means spaced from said actuator shaft in a second radial direction; a turret fixedly mounted on said actuator shaft and adapted to reciprocate therewith; first and second die means on said turret positioned to correspond respectively and alternatively with said mold and said article removal means; each of said die means when cooperating with said mold enabling an article to be formed therebetween; camming means between said frame and said actuator shaft causing rotational movement of said actuator shaft and turret simultaneously with the reciprocating movement thereof by said head; said camming means simultaneously aligning said first and second die means respectively with said mold and removal means and vice versa; said reciprocating actuator shaft and turret causing simultaneous interengagement, both between said first die and said mold and also between said second die and said removal means and vice versa; and ejection means associated with said removal means and operably connected to said actuator shaft to reciprocate therewith in a manner such that with movement of said turret away from said removal means said ejection means is simultaneously actuated to eject an article from said removal means.

References Cited in the file of this patent

UNITED STATES PATENTS

| | | |
|---|---|---|
| 898,696 | Southworth | Sept. 15, 1908 |
| 2,155,316 | Lauterbach | Apr. 18, 1939 |
| 2,228,614 | Soubier et al. | Jan. 14, 1941 |
| 2,257,732 | Clark | Oct. 7, 1941 |
| 2,441,525 | Zesbaugh | May 11, 1948 |
| 2,766,060 | Fuller | Oct. 9, 1956 |
| 2,780,372 | Covitt et al. | Feb. 5, 1957 |
| 2,830,323 | Krebs et al. | Apr. 15, 1958 |
| 2,924,481 | Wagstaff | Feb. 9, 1960 |